(12) United States Patent
Fujinoki et al.

(10) Patent No.: US 6,925,036 B2
(45) Date of Patent: Aug. 2, 2005

(54) OPTICAL PICKUP APPARATUS AND OPTICAL PARTS ACCOMMODATION MODULE FOR OPTICAL PICKUP

(75) Inventors: Shinichi Fujinoki, Tokorozawa (JP); Shigeru Takaya, Tokorozawa (JP); Shigeyuki Sasanuma, Tokorozawa (JP); Kazutaka Goami, Tokorozawa (JP)

(73) Assignee: Pioneer Corporation, Tokyo-To (JP)

( * ) Notice: Subject to any disclaimer, the term of this patent is extended or adjusted under 35 U.S.C. 154(b) by 407 days.

(21) Appl. No.: 09/986,387

(22) Filed: Nov. 8, 2001

(65) Prior Publication Data

US 2002/0054547 A1 May 9, 2002

(30) Foreign Application Priority Data

Nov. 8, 2000 (JP) .......................................... 2000-341061

(51) Int. Cl.[7] .............................................. G11B 7/095
(52) U.S. Cl. ................................ 369/44.23; 369/44.37; 720/674
(58) Field of Search .......................... 369/44.23, 44.37, 369/215, 219, 244; 720/659, 672, 690, 713, 717, 674

(56) References Cited

U.S. PATENT DOCUMENTS

| | | | | |
|---|---|---|---|---|
| 5,056,891 A | * | 10/1991 | Masunaga | ................... 359/813 |
| 5,828,643 A | | 10/1998 | Takeda et al. | |
| 6,185,180 B1 | * | 2/2001 | Morishita | ................... 369/244 |
| 6,445,671 B1 | | 9/2002 | Takeda et al. | |
| 6,633,530 B1 | | 10/2003 | Takeda | |

FOREIGN PATENT DOCUMENTS

JP         62157367 A  *  7/1987  ........... G11B/17/04

* cited by examiner

*Primary Examiner*—Brian E. Miller
*Assistant Examiner*—Peter Vincent Agustin
(74) *Attorney, Agent, or Firm*—Sughrue Mion, PLLC

(57) ABSTRACT

An optical pickup apparatus (100) is provided with: a carriage body (80); an optical parts accommodation module (70) mounted on said carriage body and accommodating at least (i) a light beam emitting portion (41, 42, 55) for emitting a light beam, (ii) a light beam receiving portion (57, 65), (iii) a beam splitter (44) and (iv) a grating (43) for generating a sub beam for a tracking adjustment out of the light beam emitted from said light beam emitting portion; and a grating adjustment mechanism (62, 63) for rotating said optical parts accommodation module. The optical parts accommodation module is mounted on said carriage body in such a condition that said optical parts accommodation module is allowed to rotate with an axis line of the light beam, which is irradiated toward a disc, as a rotational center. The grating adjustment mechanism has a cam plane (63) abut to an abut plane (52) formed at a portion apart from the axis line and including a slide cam member (62) mounted in such a condition that said slide cam member is regulated to be movable on a straight line with respect to said carriage body.

13 Claims, 25 Drawing Sheets

OPTICAL PICKUP APPARATUS AND OPTICAL PARTS ACCOMMODATION MODULE FOR OPTICAL PICKUP

BACKGROUND OF THE INVENTION

1. Field of the Invention

The present invention relates to an optical pickup and an optical parts accommodation module for an optical pickup, suitably used in a disc player for recording onto and/or reproducing from a disc, such as a record medium for a CD (Compact Disc), a DVD or the like.

2. Description of the Related Art

The optical pickup apparatus for a disc player (the pickup apparatus being useful for reading and/or writing from/to a disc, such as for a CD or a DVD) may be standardized and slimmed through miniaturization. Such a miniaturized optical pickup apparatus can be used for various types of disc players.

The optical pickup apparatus equipped in a disc player is an apparatus for condensing a light beam, the light beam being emitted from a light emitting portion provided in the optical pickup apparatus onto an information recording surface of the disc (which is an information record medium), through an objective lens, to thereby optically record the information in a large data volume, as well as for collecting the reflected light from the disc irradiated with the light beam and then guiding the reflected light to a light receiving portion provided in the optical pickup apparatus, to thereby reproduce the record information.

In such a disc player, the disc is loaded on a turn table which is rotationally driven by a spindle motor, and, in case of recording the information onto or reproducing the recorded information from the disc, tracking control is performed such that the information reading light beam follows the information track on the disc, so as to permit the recording and/or reproduction of information.

Tracking control is performed as follows. Namely, the light beam emitted from the light emitting portion of the optical pickup apparatus is divided into one main beam and two sub beams, by a grating as one example of an optical element. Then, the two sub beams are irradiated onto the information recording surface in such a way that the two sub beams are inclined by a predetermined angle with respect to a tangential direction of the information track which the arrayed direction of the two sub beams is to follow. Then, the reflected lights from the information recording surface of the two sub beams are respectively detected by the light receiving portion of the optical pickup apparatus. Finally, by performing signal processing which obtains the difference between the outputs of those light receiving portions, control of the tracking direction at the time of recording or reproducing the information is achieved.

In this kind of optical pickup apparatus, errors of inaccuracy in assemblage/manufacturing, such as dimensional accuracy or the like, are inevitable at the time of assembling the optical parts. For instance, the arrayed direction of the two sub beams generated by the grating may be offset from the predetermined angle with respect to the tangential direction of the information track being followed, resulting in inaccurate tracking control performance.

In such an occurence, the rotation angle around the optical axis for the grating element in the optical pickup apparatus must be adjusted so as to compensate for the undesired offset, and an adjusting mechanism is therefore required.

Further, a holding mechanism is also required so as to hold or maintain the condition of the grating, which has been mechanically adjusted. However, due to the slimming of the optical pickup apparatus as a result of miniaturization, it is difficult or even impossible to install an adjusting mechanism for mechanically rotating the grating element in the optical pickup apparatus.

SUMMARY OF THE INVENTION

The present invention is proposed in view of the above mentioned problems. It is therefore an object of the present invention to provide an optical pickup apparatus and an optical parts accommodation module for an optical pickup, which can perform the grating adjustment while employing a rather simple structure.

The above object of the present invention can be achieved by an optical pickup apparatus provided with: a carriage body; an optical parts accommodation module mounted on the carriage body and accommodating at least (i) a light beam emitting portion for emitting a light beam, (ii) a light beam receiving portion, (iii) a beam splitter and (iv) a grating for generating a sub beam for a tracking adjustment out of the light beam emitted from the light beam emitting portion; and a grating adjustment mechanism for rotating the optical parts accommodation module, the optical parts accommodation module being mounted on the carriage body in such a condition that the optical parts accommodation module is allowed to rotate with an axis line of the light beam, which is irradiated toward a disc, as a rotational center, the grating adjustment mechanism having a cam plane abutting an adjacent plane formed at a portion apart from the axis line and including a slide cam member mounted in such a condition that the slide cam member is regulated to be movable on a straight line with respect to the carriage body.

According to the optical pickup apparatus of the present invention, since the optical parts accommodation module is rotatable with the axis line of the light beam and since the grating adjustment mechanism includes the cam plane abutting the adjacent plane, and further, since the slide cam member is mounted in such a condition that the slide cam member is movable on a straight line with respect to the carriage body, it is possible to perform the grating adjustment while simultaneously achieving a space factor improvement, and all while employing a rather simple structure.

In one aspect of the optical pickup apparatus of the present invention, the slide cam member is movable on a straight line in parallel to a plane including the axis line.

In this aspect, the cam plane may be inclined with respect to the straight line.

In another aspect of the present invention, the slide cam member comprises an engagement aperture portion with which a driver for a grating adjustment is engaged.

In another aspect of the optical pickup apparatus of the present invention, wherein the optical parts accommodation module comprises: an annular guide portion disposed around an opening through which the light beam is irradiated to an external portion thereof with the axis line of the light beam as a center; and a circular arc protrusion with the axis line as a center on a line extended from the axis line.

In this aspect, the carriage body may comprise: a V shaped supporting portion for supporting the annular guide portion; and a V shaped supporting portion for supporting the circular arc protrusion.

The above object of the present invention can be also achieved by an optical parts accommodation module mounted on an optical pickup apparatus comprising: a casing body; at least (i) a light beam emitting portion, (ii) a light beam receiving portion, (iii) a beam splitter for splitting an outgoing light beam (which is directed toward a disc from the light beam emitting portion) from a returning light beam (which is directed toward the light beam receiving portion from the disc) and (iv) a grating for generating a sub beam for a tracking adjustment out of a light beam emitted from the light beam emitting portion, which is accommodated in the casing body; and an opening portion formed in the casing body, through which the light beam is irradiated to an external portion toward the disc, the casing body comprising an annular guide portion disposed around the opening portion with an axis line of the light beam irradiated through the opening portion as a center, a circular arc protrusion with the axis line as a center on a line extended from the axis line, and an abutting adjacent plane which is formed at a portion apart from the axis line and to which a grating adjustment member abuts with the axis line as a center thereof.

According to the optical parts accommodation module, the annular guide portion is disposed around the opening portion with the axis line as a center and the circular arc protrusion is disposed with the axis line as a center. The abutting adjacent plane is formed apart from the axis line, to which the grating adjustment member abuts with the axis line as a center. Accordingly, it is possible to perform the grating adjustment and possible to improve a space factor, while employing a rather simple structure.

The nature, utility, and further features of this invention will be more clearly apparent from the following detailed description with respect to preferred embodiments of the invention when read in conjunction with the accompanying drawings briefly described below.

DETAILED DESCRIPTION OF EXEMPLARY EMBODIMENTS

Figure 1:
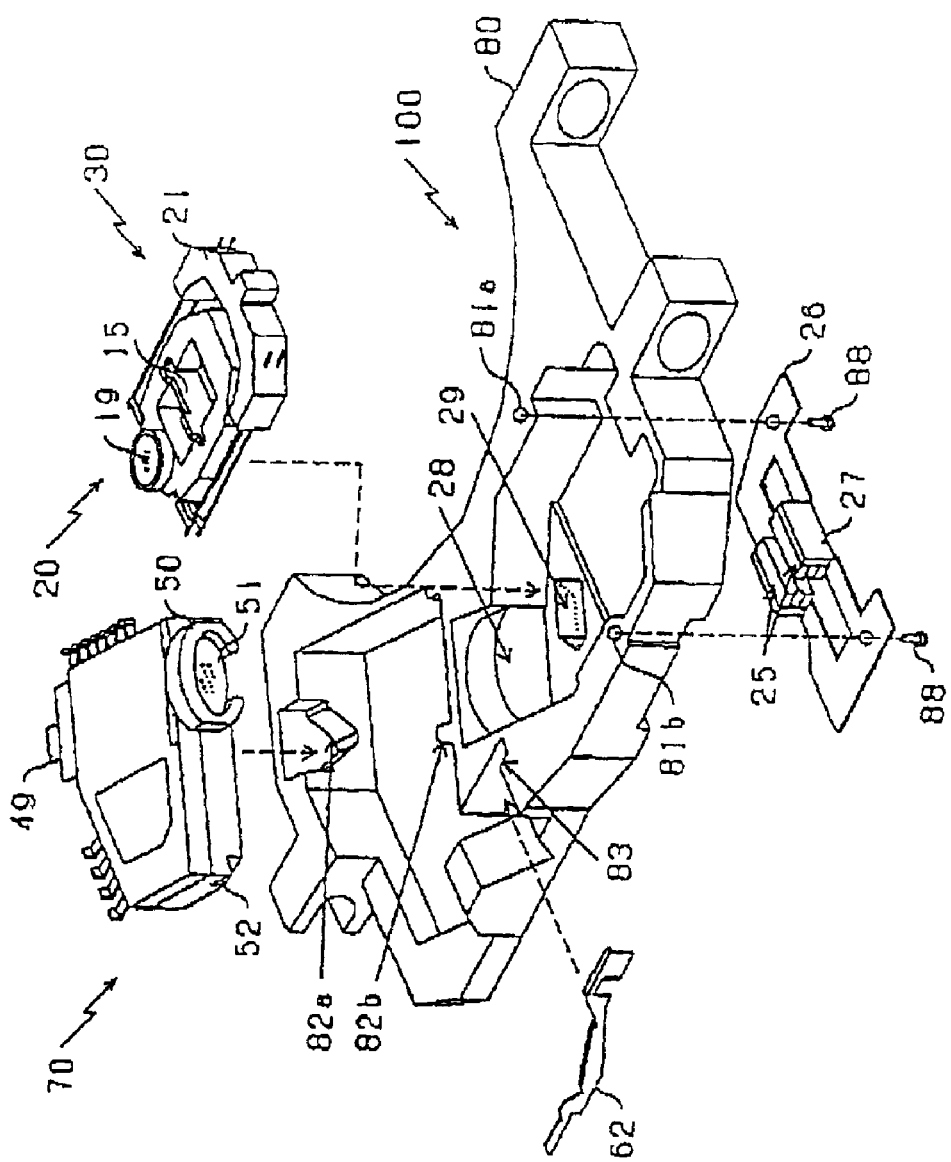
FIG. 1 is a perspective configuration development view showing an optical pickup apparatus according to an embodiment of the present invention.
Figure 2:
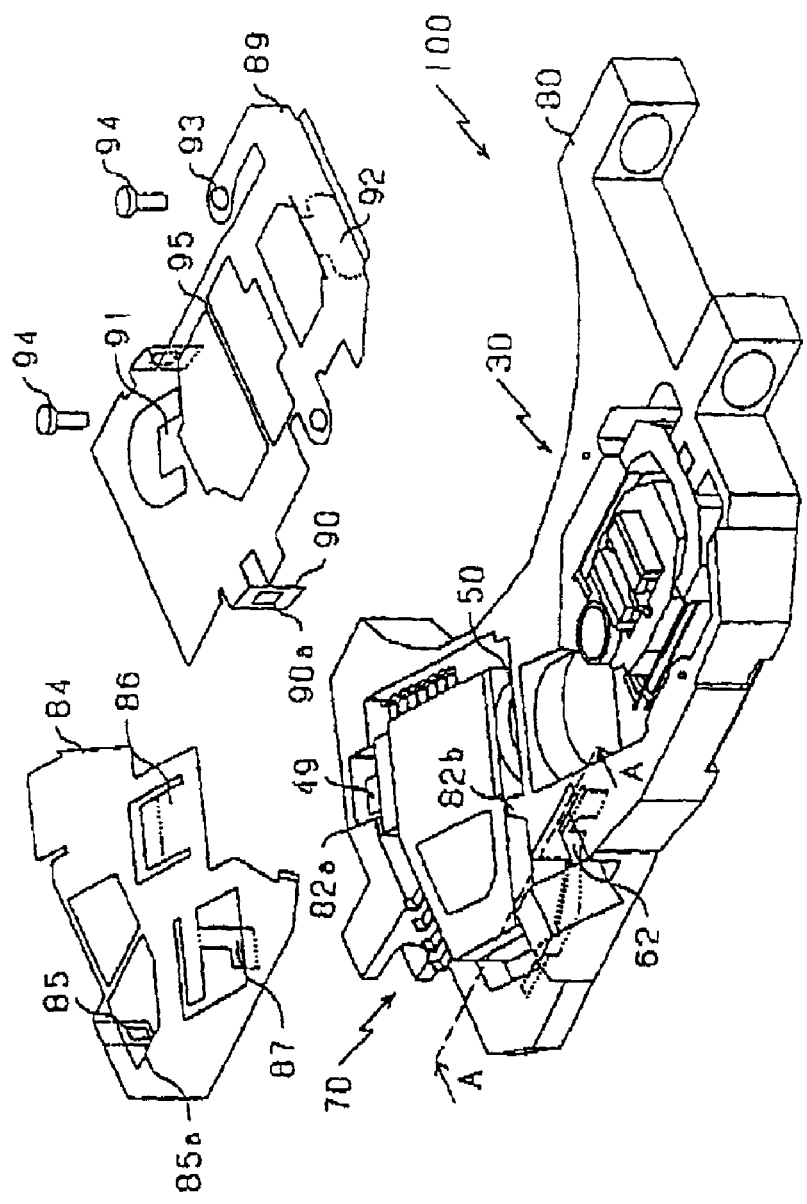
FIG. 2 is a perspective configuration development view showing a module plate and an actuator cover of the optical pickup apparatus according to the embodiment.

An optical pickup apparatus 100 according to an embodiment of the present invention will be explained below with reference to the drawings. The optical pickup apparatus 100 according to this embodiment is provided with: a module 70 serving as one example of an optical part accommodating module for an optical pickup in which optical parts, such as two light emitting devices for emitting light beams whose wave lengths are different from each other, a grating, a beam splitter, a light receiving device and the like are integrated into a single resin package unit; and an actuator unit 30 in which an objective lens is built. So, the optical pickup apparatus 100 is miniaturized and thinned. Also, such an optical pickup apparatus 100 is designed so as to carry out a grating adjustment, which is typically done, from an outer side of the module 70. The entire configuration of the optical pickup apparatus 100 will be described below with reference to FIG. 1 and FIG. 2. By the way, FIG. 1 and FIG. 2 are configuration development views showing the optical pickup apparatus 100 according to this embodiment.

The optical pickup apparatus 100 in this embodiment is provided with: a carriage body 80 molded from resin; the module 70 that accommodates the light emitting element for emitting a light beam as described later and the light receiving element and the like; a collimator lens 28 and a raising mirror 29 that are fixed at predetermined positions of the carriage body 80; an actuator base 26 made of metallic flat plate, where a pair of magnets 25 are adhered and fixed to two yokes 27 which are partially bent in an L-shaped manner and are separated from each other; the actuator unit 30 including a suspension base 21 and a moving unit 20 serving as one example of a movable body; and a slide cam member 62 serving as one example of a grating adjusting mechanism of the module 70.

In the module 70, an annular guide 50 with which a cover glass 51 is engaged is formed on one side thereof, and a circular arc protrusion 49 is formed on the other side thereof. The annular guide 50 of the module 70 is an opening from which the light beam is emitted, and an outer circumference thereof is formed in a form of substantial circle, and a central axis of the protrusion 49 is formed on an extension line of the center. In short, a central axis of the annular guide 50 and the central axis of the protrusion 49 are formed on the same straight line (hereafter, the "same straight line" is referred to as an "axis line").

In a different embodiment, instead of the protrusion, an annular guide 50 apart from the above-mentioned annular guide 50 may be formed and a central axis thereof may be formed on the same straight line. The module 70 is rotated with such an axis line as a center. Thus, a contact plane 52 is formed at a portion departing from the axis line.

The module 70 is mounted at a predetermined position of the carriage body 80. The circular arc protrusion 49 of the module 70 is inserted into a V-shaped supporter 82a formed on the carriage body 80, and the annular guide 50 of the module 70 is inserted into a V-shaped supporter 82b formed on the carriage body 80. At this time, the annular guide 50 of the module 70 is arranged at a position opposite to the collimator lens 28 fixed to the carriage body 80. Then, the contact hole 52 of the module 70 is arranged on a shift cam member 62 inserted into a slide groove 83 of the carriage body 80. The shift cam member 62 is sandwiched between the contact hole 52 of the module 70 and the slide groove 83 of the carriage body 80, and slidably held without any lateral turning and drop. Due to the above-mentioned configuration, the module 70 is rotatably supported by the V-shaped supporter 82a and the V-shaped supporter 82b formed on the carriage body 80.

On the other hand, the actuator base 26 where the magnet 25 is fixed to each of the pair of yokes 27, which are partially bent in the L-shaped manner and are separated from each other, is installed to two installation holes 81a and 81b made in the carriage body 80 through two vises 88 from a bottom side of the carriage body 80. Then, the actuator unit 30 is mounted from a top side of the carriage body 80. Accordingly, a printed substrate coil 15 of the actuator unit 30 is inserted into a substantial center of the pair of magnets 25. Also, an objective lens 19 of the actuator unit 30 is arranged at a position to cover the raising mirror 29.

The module 70 is held within the carriage body 80 by a module plate 84, as shown in FIG. 2. The module plate 84 is made of elastic copper plate that is excellent in heat conduction property. A plurality of fixing units 85 each having a hold hole 85a, a pushing unit 86 curved toward the inside, and a holding unit 87 that is bent toward the inside are disposed in the module plate 84. The module plate 84 is fixed by inserting the hold holes 85a of the fixing units 85 into a plurality of protrusions (not shown) formed on the carriage body 80. The module 70 is pushed against the side of the V-shaped supporter 82a of the carriage body 80 by the holding unit 70 of the module plate 84, and it is held in a condition that it is pushed against a bottom side of the carriage body 80 by the pushing unit 86. Also, the module plate 84 has a role of a heat sink for dissipating the heat generated by the module 70.

Also, the actuator unit 30 is held within the carriage body 80 by an actuator cover 89, as shown in FIG. 2. A plurality of fixing units 90 each having a hold hole 90a, a pushing unit 91 curved toward the inside, and a holding unit 92 that is bent toward the inside are disposed in the actuator cover 89, similarly to the module plate 84. The actuator cover 89 is fixed by inserting the hold holes 90a of the fixing units 90 into a plurality of protrusions (not shown) formed on the carriage body 80 and further using two vises 94 penetrating two fixing holes 93. By the way, the actuator unit 30 will be described later in detail.

The holding unit 92 of the actuator cover 89 is inserted into gap between the moving unit 20 and the suspension base 21, and it pushes the suspension base 21 against the side of the carriage body 80. The actuator unit 30 is held as the suspension base 21 is fixed to the carriage body 80. The pushing unit 91 of the actuator cover 89 is disposed to protect the drop of the collimator lens 28. Also the actuator cover 89 has a role of opening the portion above the objective lens 19 by disposing a window while leaving a partial stopper 95 in a center, and also regulating a movement range in a focus direction of the moving unit 20 through the stopper 95.

Figure 3:
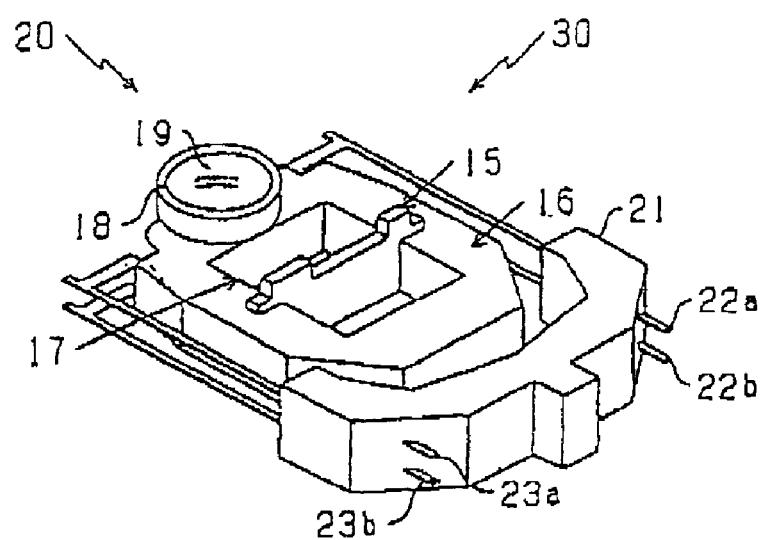
FIG. 3 is an external perspective view of an embodiment of the invention showing an actuator unit.
Figure 4:
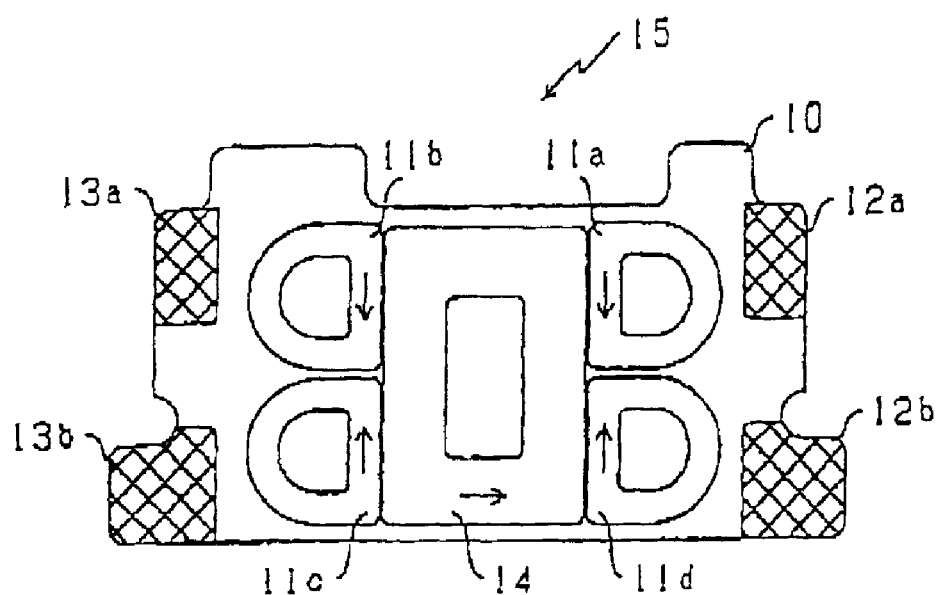
FIG. 4 is a plan view of an embodiment of the invention showing a printed substrate coil.
Figure 5:
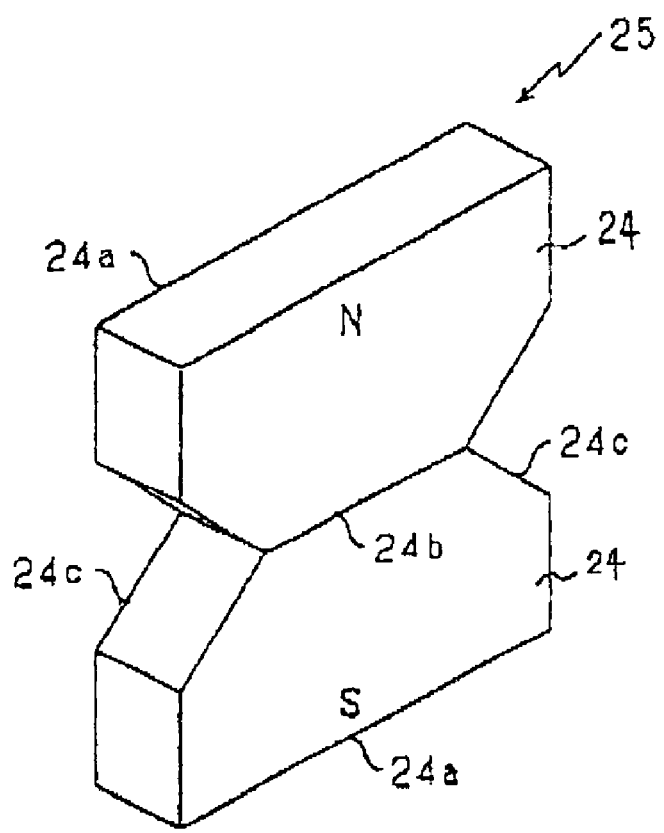
FIG. 5 is an external perspective view of an embodiment of the invention showing a magnet.
Figure 6:
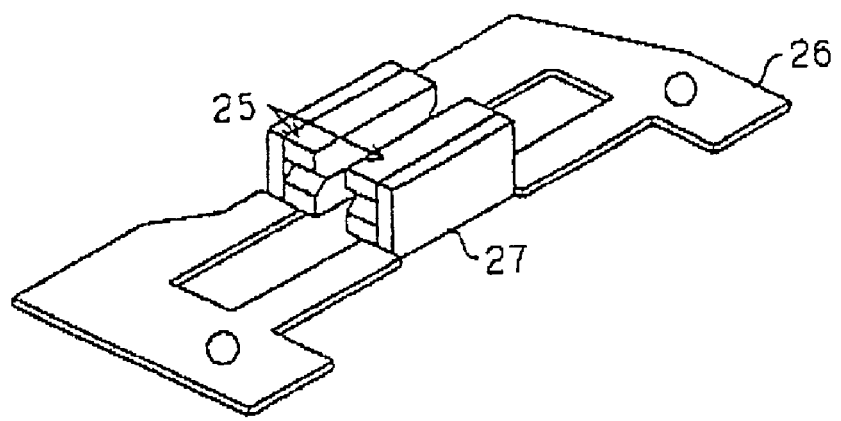
FIG. 6 is an external perspective view of an embodiment of the invention showing the magnet fixed to a yoke of an actuator base.
Figure 7:
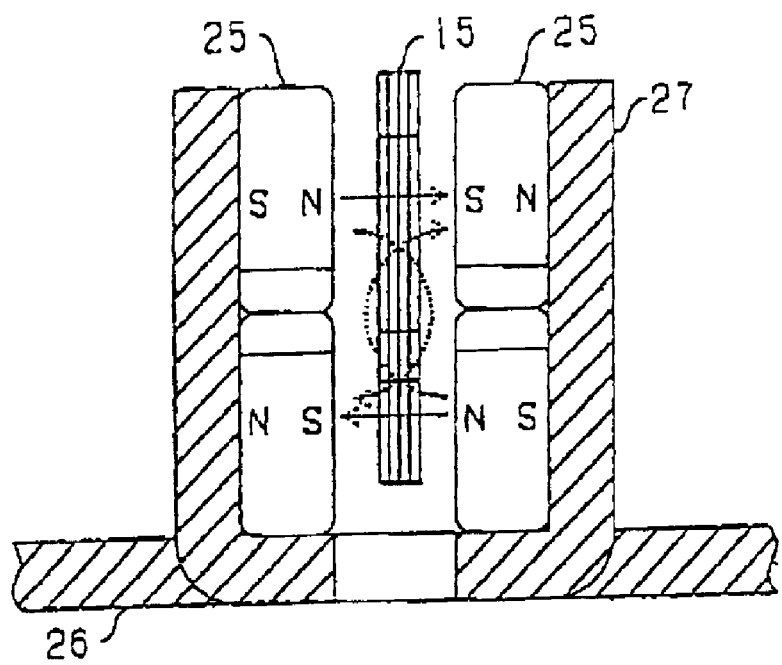
FIG. 7 is a side view of an embodiment of the invention showing the printed substrate coil and the magnet fixed to the yoke.
Figure 8:
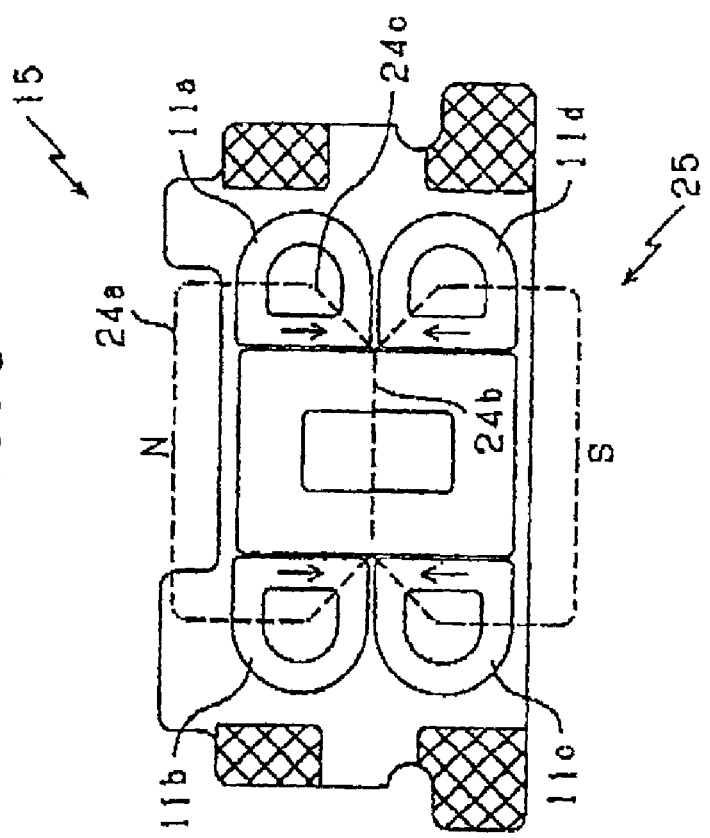
FIG. 8 is a plan view of an embodiment of the invention showing a positional relation between the printed substrate coil and the magnet.

Next, the configuration of the actuator unit 30 used in the optical pickup apparatus 100 in this embodiment will be described below with reference to FIG. 3 to FIG. 8. FIG. 3 is a perspective view showing the outer shape of the actuator unit 30. FIG. 4 is a plan view showing the printed substrate coil 15. FIG. 5 is a perspective view showing the outer shape of a magnet 26. FIG. 6 is a perspective view showing the outer shape of the actuator base 26 to which the magnet 25 is adhered. FIG. 7 is a partially sectional view showing the positional relation between the printed substrate coil 15 and the magnet 25 adhered to the yoke 27. FIG. 8 is a plan view showing the positional relation between the printed substrate coil 15 and the magnet 25.

The actuator unit 30 is configured such that the moving unit 20 is movably supported by four elastic bar members 22a and 22b, 23a and 23b fixed to the suspension base 21, as shown in FIG. 3. The moving unit 20 is composed of the printed substrate coil 15 and the lens holder 16 to which the objective lens 19 is fixed. The lens holder 16 is the substantially rectangular member made from resin. An installation hole 18 for the objective lens 19 is made in one end thereof, and a rectangular opening 17 is made in a center thereof. Such an opening 17 is made so as to mount the printed substrate coil 16 at a substantial center thereof, and separately arrange a pair of magnets 25 on both sides of the printed substrate coil 15 inside the opening.

When the lens holder 16 and the suspension base 21 are molded from the resin, they are molded integrally with the four elastic bar members 22a and 22b, 23a and 23b. One ends of the four elastic bar members 22a and 22b, 23a and 23b are pulled out of the side of the suspension base 21, and are used as terminals to send the tracking error signal and the focus error signal to the printed substrate coil 15. Also, the other ends of the four elastic bar members 22a and 22b, 23a and 23b are extendedly installed to the inside of the lens holder 16, and connected to the printed substrate coil 15 mounted in the opening 17 of the lens holder 16.

The printed substrate coil 15 constituting the actuator unit 30 is formed by printing a plurality of coils on a double faced copper lamination substrate 10, which is a single plane substrate, and carrying out an etching operation, as shown in FIG. 4. In the printed substrate coil 15, a focus coil 14 is formed in a substantial center on one copper foil surface. Then, two tracking coils 11a and 11d are disposed adjacently to the right of the focus coil 14, and two tracking coils 11b and 11c are disposed adjacently to the left of the focus coil 14. In short, the four tracking coils 11a to 11d have two sets, each composed of upper and lower tow coils arrayed in the focus direction, and the two sets are arrayed in the tracking direction. Also, in the printed substrate coil 15, two tracking input/output terminals 12a and 12b and two focus input terminals 13a and 13b are disposed in an outer circumference of the double faced copper lamination substrate 10.

The tracking A coil 11a connected to the tracking input terminal 12a, in which a spiral coil is formed counterclockwise from the outer circumference to the inner circumference, is connected through a through hole and a copper foil pattern (that are not shown) to the tracking B coil 11b. The tracking B coil 11b, in which a coil is formed clockwise from the inner circumference to the outer circumference, is connected to the tracking C coil 11c. The tracking C coil 11c, in which a coil is formed counterclockwise from the outer circumference to the inner circumference, is connected through a through hole and a copper foil pattern (that are not shown) to the tracking D coil 11d. And, the tracking D coil 11d, in which a coil is formed clockwise from the inner circumference to the outer circumference, is connected to the tracking output terminal 12b.

Thus, the four tracking coils 11a to 11d constituting the printed substrate coil 15 are connected in series with the tracking input/output terminals 12a and 12b. Hence, for example, if a plus voltage is applied to the tracking input terminal 12 and a minus voltage is applied to the tracking output terminal 12b, the four tracking coils 11a to 11d are designed such that the electric currents flow in directions indicated by arrows of FIG. 4.

Also, the focus coil 14 constituting the printed substrate coil 15 is the single coil arranged between the two sets of the tracking coils. The focus coil 14 connected to the focus input terminal 13a, in which a spiral coil is formed counterclockwise from the outer circumference to the inner circumference, is connected to a through hole to the focus output terminal 13b. The focus coil 14 is designed such that it is connected in series with the focus input/output terminals 13a and 13b, and if a plus voltage is applied to the focus input terminal 13a and a minus voltage is applied to the focus output terminal 13b, the electric currents flow in directions indicated by arrows of FIG. 4.

The printed substrate coil 16 is mounted at a predetermined position of the opening 17 made in the lens holder 16. At this time, the two sets of the coils in the printed substrate coil 15 are arranged at the positions symmetrical about the center of the gravity of the moving unit 20. The lens holder 16 is molded integrally with the four elastic bar members 22a and 22b, 23a and 23b, as mentioned above. The ends of the four elastic bar members 22a and 22b, 23a and 23b are formed to be partially exposed on the surface of the lens holder 16, and connected through solder to the respective terminals 12a and 12b, 13a and 13b of the printed substrate coil 15 mounted in the opening 17.

The tracking input/output terminals 12a and 12b of the printed substrate coil 15 are soldered to the two elastic bar members 22a and 22b, and the focus input/output terminals 13a and 13b of the printed substrate coil 15 are soldered to the two elastic bar members 23a and 23b, respectively (as shown in FIG. 3). Thus, the printed substrate coil 15 is designed such that when the tracking error signal is sent from the two elastic bar members 22a and 22b, the tracking drive current flows through the four tracking coils 11a to 11d, and when the focus error signal is sent to the two elastic bar members 23a and 23b, the focus drive current flows through the focus coil 14. Then, the printed substrate coil 15 is placed in the gap between a pair of magnets 24 as the actuator unit 30 is mounted on the carriage body 80.

Next, the structure of the magnet 25 constituting the actuator unit 30 will be described below with reference to FIG. 5. The magnet 25 is constructed by adhering two trapezoidal small magnets 24, in which both poles are magnetized, to each other as shown in FIG. 5. The small magnet 24 is constructed in the trapezoidal manner composed of a bottom portion 24a, a top plane 24b that is narrower in width than the bottom plane 24a, and two inclined portions 24c inclined at approximately 45 degrees. The magnet 25 is constructed by turning over another small magnet 24 upside-down and placing it on the top plane 24b of the small magnet 24, adhering their top planes to each other, and arranging the planes of the different magnet electrodes on the same plane.

As shown in FIG. 6, the magnets 25 are respectively fixed to the two yokes 27, which are constructed by partially bending the actuator base 26 into a L-shape and separating them from each other, by using adhesive and the like. At this time, in order that the magnetic poles of the small magnets 24 located opposite to each other are different from each other, one magnet 25 is turned over and is fixed to the yoke 27. The arrangement of the polarity of this magnet 25 will be described below with reference to FIG. 7.

FIG. 7 is a side view showing the positional relation between the printed substrate coil 15 and the magnets 25 fixed to the yokes 27. As shown in FIG. 7, the magnets 25 are arranged such that the polarities of the small magnets 24 opposite to the printed substrate coil 15 are different from each other, and the polarities of the small magnets 24 opposite to each other are different from each other. Such arrangement generates the magnetic flux (which are indicated by dotted arrows in FIG. 7) sent from one small magnet 24 through the printed substrate coil 15 to the other opposite small magnet 24. Also, it generates a magnetic flux sent from the small magnet 24 placed in the upper portion, through the printed substrate coil 16, to the small magnet 24 placed in the lower portion. Thus, the pair of magnets 25 can give the strong magnetic flux to the tracking coil 11 and the focus coil 14 of the printed substrate coil 15.

FIG. 8 is a plan view showing the positional (initial positional) relation between the magnets 25 and the printed substrate coil 15. As shown in FIG. 8, the width of the bottom plane 24a of the small magnet 24 constituting the magnet 25 is configured so as to cover up to the vicinity of the substantial centers of the four tracking coils 11a to 11d. The width of the top plane 24b of the small magnet 24 is configured substantially equal to the width in the tracking direction of the focus coil 14. Also, the inclination portion 24c of the small magnet 24 is configured so as to overlap with a central line of approximately 45 degrees passing through the centers of the respective tracking coils 11a to 11d.

As shown in FIG. 8, the magnet 25 serving as the magnetic circuit is designed so as to apply the magnetic fluxes opposite to each other along a jitter direction (which is an array direction of the pair of magnets 25 located opposite to each other, namely, a direction vertical to a paper plane in FIG. 8) to the two tracking coils 11a and 11b arranged in the upper portion and the two tracking coils 11c and 11d arranged in the lower portion, and further applying the magnetic fluxes opposite to each other to the upper portion and the lower portion of the focus coil 14. Also, the magnet 25 is designed so as not to apply the magnetic fluxes to the portions adjacent to the two upper tracking coils 11a and 11d and the two lower tracking coils 11b and 11c. The optical pickup apparatus 100 employs such magnets 25 to thereby suppress the rotationally driving force affecting the printed substrate coil 15, as described later.

Figure 9:
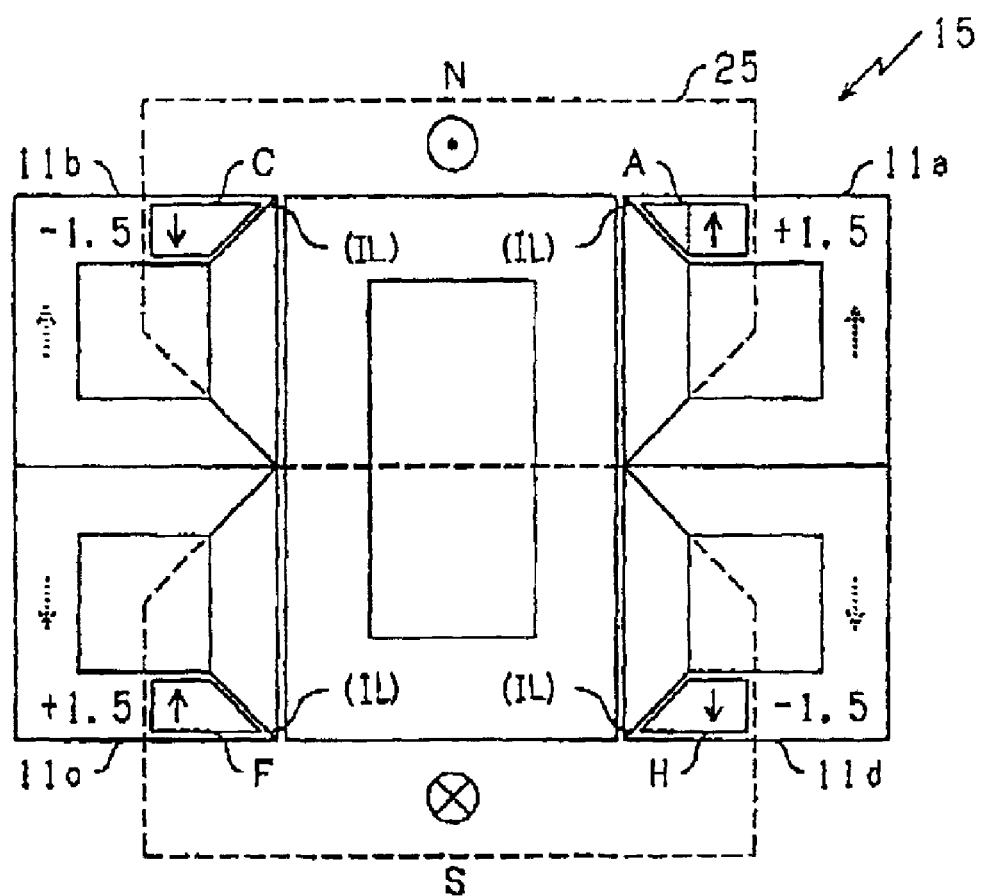
FIG. 9 is a schematic plan view of an embodiment of the invention for explaining an operation of a rotationally driving force induced in the printed substrate coil.

Next, the operation of the rotationally driving force occurring in the printed substrate coil 15 will be described below with reference to FIGS. 9 through 12. When the operation of the printed substrate coil 15 is described, in order to represent the occurrence of the rotationally driving force as a numeral, it is assumed that the magnets 25 and the four tracking coils 11a to 11d are indicated by using the manner in which they can be easily represented as numerals. In short, in order to clarify the driving forces in the respective portions of the four tracking coils 11a to 11d (the driving forces in parts of the coils generated by the orientations of the magnetic fluxes and the orientations of the electric currents flowing through the coils), the coils are represented as squares, as shown in FIG. 9. Four corners of the square coil imply the boundaries between the driving forces occurring in the tracking direction of the printed substrate coil 15 and the driving forces occurring in the focus direction. Then, it is assumed here that those portions are evidently separated by indicating them with slant lines (indicated by lines "IL" in FIG. 9). Also, in order to clarify the suppression effect of the rotationally driving force occurring in the printed substrate coil 15, it is described together with a rotationally driving force when the magnet 25 is replaced by a rectangular magnet 28 as a comparison example.

If the magnet 25 has the polarity shown in FIG. 9 and the drive currents flow through the tracking coils 11a to 11d in the directions indicated by dotted arrows in FIG. 9, driving forces generated from regions P, Q, R and S of the respective tracking coils 11a to 11d become the forces (a left direction on the paper plane in FIG. 9) along the same direction as the tracking direction, and this synthesized force becomes the originally tracking drive force. However, in the tracking coils 11a to 11d, since the magnetic forces are applied to the magnets 25, even in the regions besides the above-mentioned regions P, Q, R and S. Thus, the driving forces are induced even from those regions.

In FIG. 9, a driving force in a focus direction indicated by the arrow is induced in a portion A of the tracking coil 11a. Here, an area of the portion A of the tracking coil 11a can be represented by one square and one right triangle. Thus, if the portion of the square is assumed to be "1" and the portion of the right triangle is assumed to be "0.5", it can be numerically represented as "1.5". Also, the driving force induced in the portion A of the tracking coil 11a is upwardly induced in the focus direction. Hence, this is represented as an upward arrow, and it is represented as "+1.5" together with the above-mentioned numerical representation.

When the driving forces of the respective tracking coils 11 are determined by using the similar method, a driving force of a portion C of the tracking coil 11 is "−1.5", a driving force of a portion F of the tracking coil 11c is "+1.5", and a driving force of a portion H of the tracking coil 11d is "−1.5". The driving force induced in the portion A of the tracking coil 11a and the driving force induced in the portion H of the tracking coil 11d have the same strength and the directions opposite to each other. Thus, these induced driving forces are canceled out. Similarly, the driving force induced in the portion C of the tracking coil 11b and the driving force induced in the portion F of the tracking coil 11c have the same strength and the directions opposite to each other. Thus, these induced driving forces are canceled out. Hence, the driving forces in the focus directions are not induced in the respective tracking coils 11a to 11d. Therefore, the rotationally driving force is not induced in the printed substrate coil 15.

Figure 10:
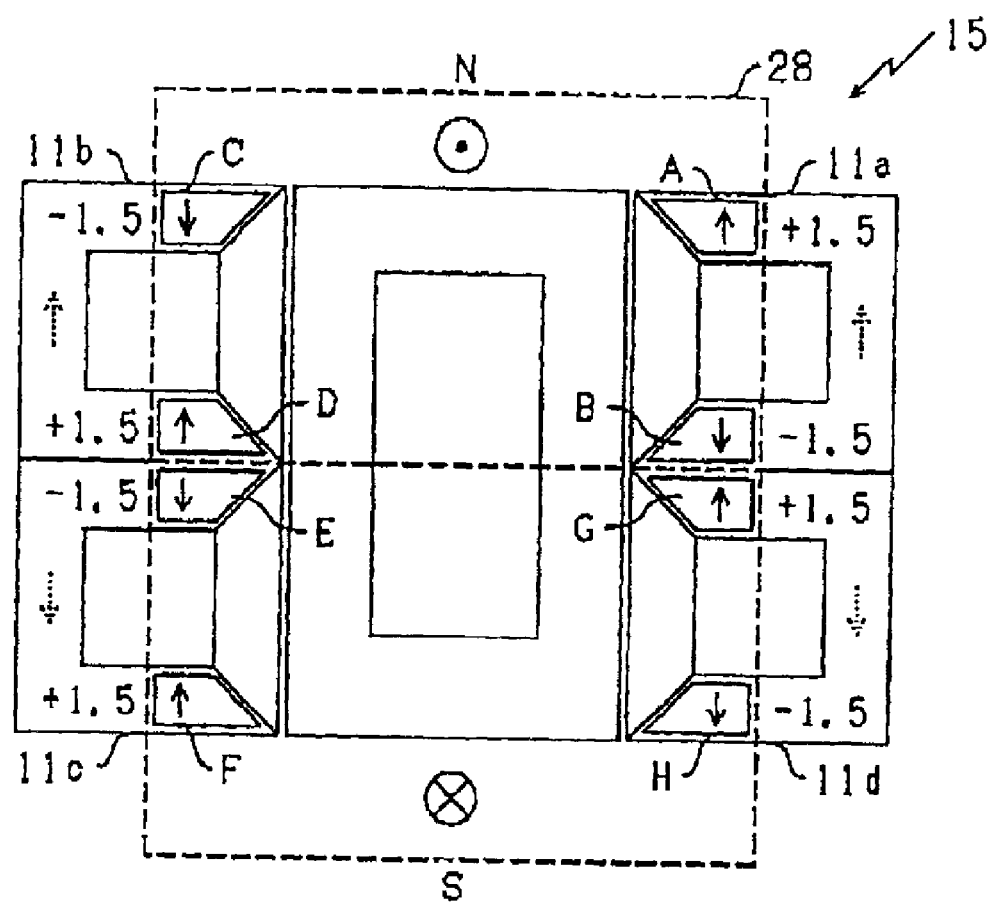
FIG. 10 is a schematic plan view of an embodiment of the invention for explaining an operation of the rotationally driving force induced in the printed substrate coil.

Next, with reference to FIG. 10, a further exemplary embodiment of the invention is depicted wherein the magnet 25 is replaced by a rectangular magnet 28. As shown in FIG. 10, the driving force in the focus direction induced in each tracking coil 11 in using the rectangular magnet 28 is newly induced in a portion B of the tracking coil 11a, a portion D of the tracking coil 11b, a portion E of the tracking coil 11c and a portion G of the tracking coil 11d, as compared with the case of using the magnet 25 in the trapezoidal shape. Similarly to the above-mentioned case, when the driving forces of the respective tracking coils 11a to 11d are determined and are then compared, the driving forces in the focus direction of the respective portions of the tracking coils 11a to 11d generate the driving forces having the same strength and the directions opposite to each other, to be thereby cancelled out by each of the tracking coils 11a to 11d in the respective insides thereof. Hence, the rotationally driving force is not induced in the printed substrate coil 15.

Figure 11:
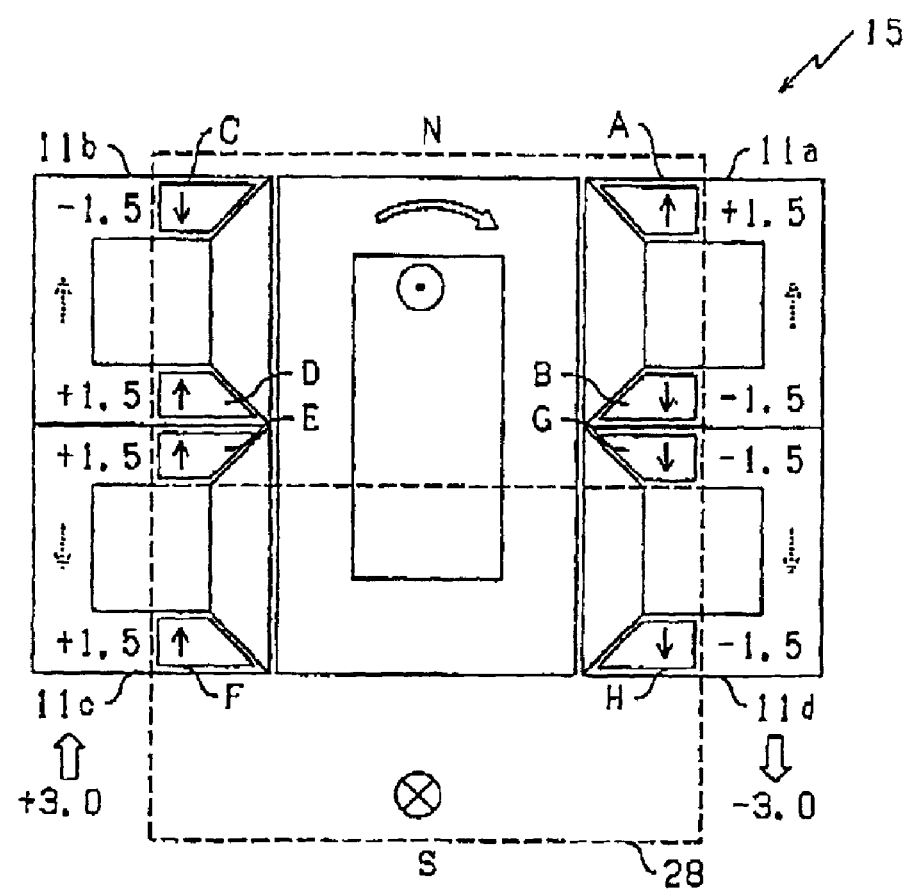
FIG. 11 is a schematic plan view of an embodiment of the invention for explaining an operation of the rotationally driving force induced in the printed substrate coil.

Next, as shown in FIG. 11, an exemplary embodiment of the invention is described wherein the printed substrate coil 15 is moved upwardly in the focus direction with respect to the initial position. In this case, the portion E of the tracking coil 11c and the portion G of the tracking coil 11d become in such a condition that they receive the influence of magnetic fluxes from an N-pole of the magnet 28. The respective driving forces are determined similarly to the above-mentioned case. In the tracking coil 11a and the tracking coil 11b, the driving forces in the focus direction are not induced similarly to the case that they are at the initial positions.

On the other hand, in the tracking coil 11c, a driving force of "+1.5" is induced in the portion E by the magnetic fluxes from the N-pole, which is then combined with the driving force of "+1.5" induced in the portion F, to thereby induce a driving force (indicated by a hollow arrow in FIG. 11) of "+3.0" in the focus direction. Also, in the tracking coil 11d, a driving force of "−1.5" is induced in the portion G by the magnetic fluxes from the N-pole, which is then combined with the driving force of "−1.5" induced in the portion H, to thereby induce a driving force (indicated by a hollow arrow in FIG. 11) of "−3.0" in the focus direction. Thus, in the printed substrate coil 15, a rightward rotational moment force is induced by the driving force in the focus direction symmetrically about those two gravity centers. This rotational moment force has the strength proportional to the synthesized driving force of "3.0".

Figure 12:
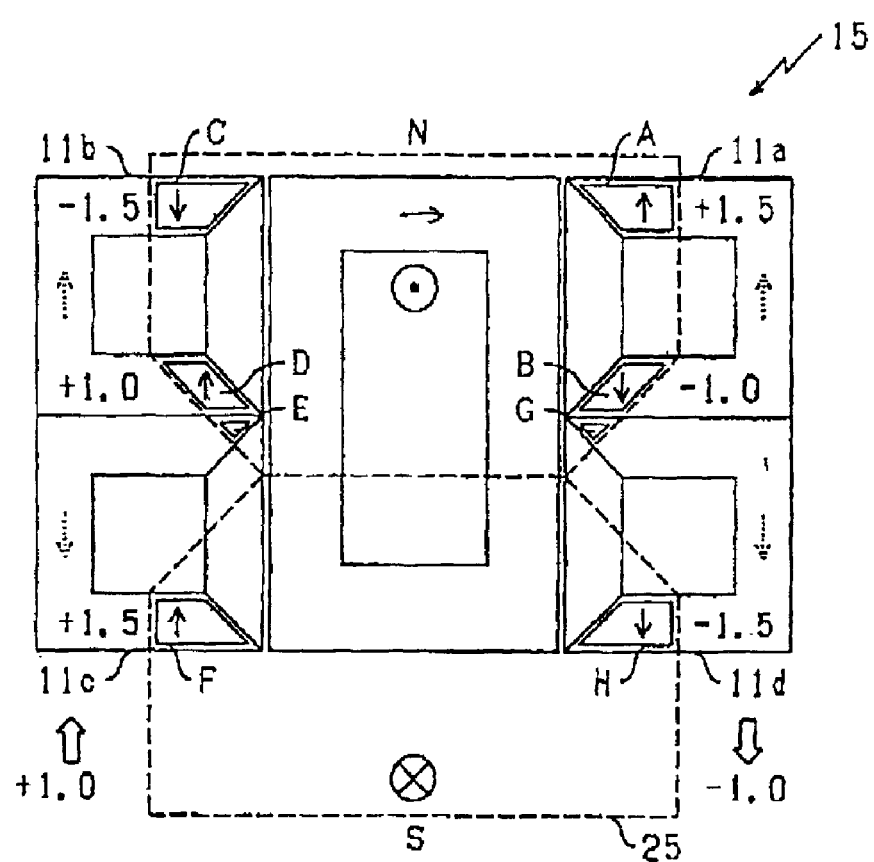
FIG. 12 is a schematic plan view of an embodiment of the invention for explaining an operation of the rotationally driving force induced in the printed substrate coil.

Next, the exemplary embodiment of the invention shown in FIG. 12 is described below. The embodiment shown in FIG. 12 is similar to the embodiments described above in terms of the printed substrate coil 15 moving upwardly with respect to the initial position. In the portion B of the tracking coil 11a, the inclined portion 24c of the magnet 25 causes the area receiving the magnetic fluxes from the N-pole to be narrowed. Accordingly, the influence of the magnetic fluxes is not easily received. The portion B of the tracking coil 11a is a region indicated by two right triangles. Thus, a driving force in the focus direction of "−1.0" is induced. Similarly, a driving force of "+1.0" is induced in the portion D of the tracking coil 11*b*.

On the other hand, in the portion E of the tracking coil 11*c*, an area receiving the magnetic fluxes from the N-pole of the magnet 25 is almost null so that the induced driving force is very weak. This situation is similar in the portion G of the tracking coil 11*d*. Here, the synthesis or combining of the driving forces in the focus direction induced from the four tracking coils 11*a* to 11*d* is considered. The driving force of the portion A of the tracking coil 11*a* and the driving force of the portion H of the tracking coil 11*d* have the same strength and the directions opposite to each other. Thus, they cancel out each other. Also, the driving force of the portion C of the tracking coil 11*b* and the driving force of the portion F of the tracking C coil 11*c* have the same strength and the directions opposite to each other. Thus, they cancel out each other.

Hence, the focus direction driving force "−1.0" of the portion B of the tracking coil 11*a* and the focus direction driving force "+1.0" of the portion D of the tracking coil 11*b* are left. Accordingly, in the printed substrate coil 15, a rightward rotational moment force is induced by the focus direction driving force symmetrical about those two gravity centers. This rotational moment force has the strength proportional to the synthesized driving force "1.0". This is approximate ⅓ as compared with the comparison example. This implies the large suppression in the rotational moment force.

As described above in detail, according to the optical pickup apparatus 100 of the present embodiment, the magnet 25 is constructed by the two trapezoidal small magnets 24 such that the top planes 24*b* thereof are adhered onto each other. Thus, the rotational moment force of the printed substrate coil 15 i.e., the rotational moment force of the movable body 20 can be drastically reduced.

Next, the structure of the module 70 used in the optical pickup apparatus 100 is described below with reference to FIGS. 13 through 15. The module 70 used in the optical pickup apparatus 100 is designed such that a method of generating a tracking error signal is different between the CD and the DVD. As the method of generating the tracking error signal, there are a three-beam method and a phase difference method. The three-beam method is optimal for the CD. However, if the three-beam method is applied to the DVD, a signal leakage from a layer that is not targeted is induced especially in a case of a two-layer, or a cross talk from an adjacent track becomes a problem in a land groove record of recording on a phase change medium at a high density. The phase difference method is suitable for the DVD. However, if the phase difference method is applied to the CD, when a beam spot is small, a wave form of the tracking error signal does not become a sine wave. So, this may be a problem at a time of a track cross. Thus, the optical pickup apparatus 100 in this embodiment is designed such that in a case of a reproduction from the CD, the tracking error signal is generated by the three-beam method suitable for a tracking error control of the CD after the pass through a grating 43, and in a case of a reproduction from the DVD, the tracking error signal is generated by the phase difference method suitable for the tracking control of the DVD. Those configurations will be described below.

The module 70 is provided with: an emitting unit 55 in which a plurality of semiconductor light emitting elements described later and the like are accommodated in a bottom case 40 molded from resin whose inside is hollow; and a light receiving unit 65 in which a plurality of semiconductor light receiving elements and the like are accommodated in a top case 56 molded from resin whose inside is hollow, similarly to the emitting unit 55. The structures of the respective configuration parts of the module 70 are described below.

Figure 13:
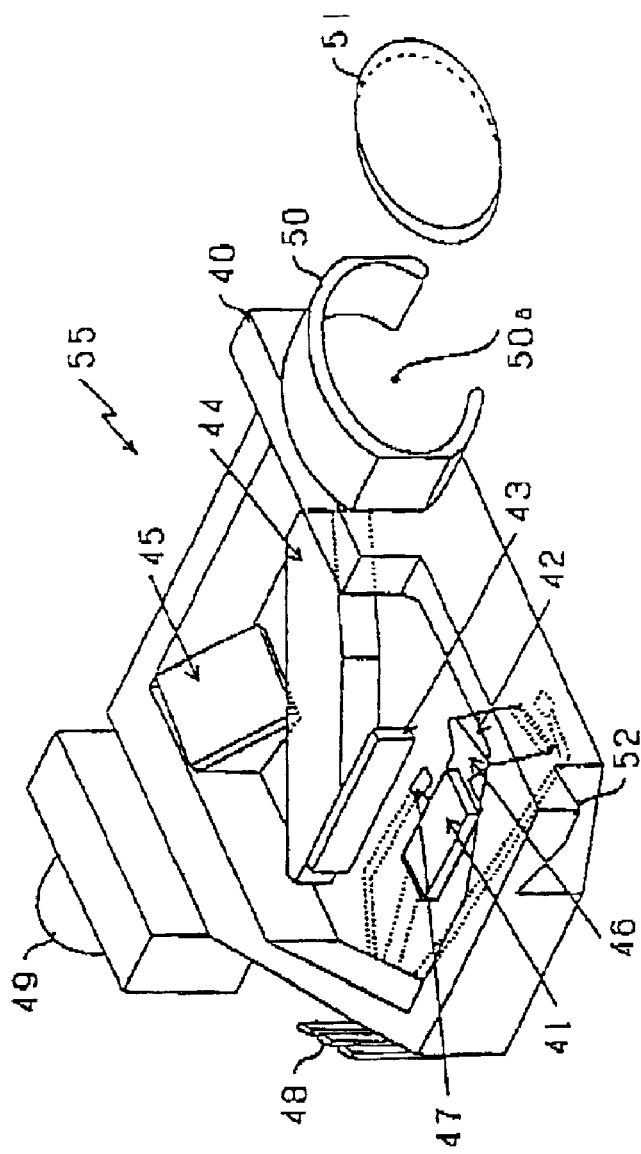
FIG. 13 is a perspective inner development view of an embodiment of the invention showing a light emitting unit.

FIG. 13 is an inner development view showing the emitting unit 55. The emitting unit 55 is configured as shown in FIG. 13 by accommodating a first light emitting element 41 for emitting a light beam having a wave length of 780 nm to an inner bottom surface of the bottom case 40 serving as one portion of a part of a body, a second light emitting element 42 for emitting a light beam having a wave length of 650 nm, a grating 43 for generating a pair of sub beams for tracking error generation from the light beam emitted by the first light emitting element 41, a beam splitter 44, and a reflection mirror 45.

The bottom case 40 is molded from resin integrally with hoop material in which a plurality of electrode frames 47 and a plurality of fixing frames 46 for semiconductor chips are punched from a metallic pate that is excellent in electrically conductive property. The bottom case 40 is molded such that the fixing frame 46 and the electrode frame 47 are exposed on the inner bottom surface, and one ends of the fixing frame 46 and the electrode frame 47 are pulled out to the external portion as terminals 48.

Also, in the bottom case 40, the circular arc protrusion 49 is formed on one outer side, the annular guide 50 is disposed on the other side, and the discoid cover glass 51 is engaged so as to cover an opening window 50*a* of the annular guide 50. An axis line for coupling the central axis of the circular arc protrusion 49 and the central axis of the annular guide 50 to each other is formed so as to agree with an optical axis of a later-described optical part. Also, in the bottom case 40, the contact plane 52 is formed at a part of an outer wall corner away from the axis line for coupling the central axis of the circular arc protrusion 49 and the central axis of the annular guide 50. Such a contact plane 52 is formed so as to give a rotation to the module 70 with the optical axis as a center. It is formed on a plane inclined to a bottom surface of the bottom case 40.

The emitting unit 55 is fixed onto the fixing frame 46 molded by exposing the respective semiconductor chips of the first and second light emitting elements 41 and 42 on the inner bottom plane of the bottom case 40, by die bonding and the like. The respective electrodes are connected to the electrode frames 47 by wire bonding and the like. Also, the emitting unit 55 is configured such that the grating 43, the beam splitter 44 and the reflection mirror 45 which are the other optical parts and the like are arranged at the predetermined positions. The emitting unit 55 is designed such that since a power supply is applied from an external portion to the respective terminals 48, a light is singly emitted from only one of the first and second light emitting elements 41 and 42, and the light beam is emitted from the center of the annular guide 50 through the grating 43 and the beam splitter 44.

Next, the structure of the light receiving unit 65 will be described below with reference to FIG. 14.

Figure 14:
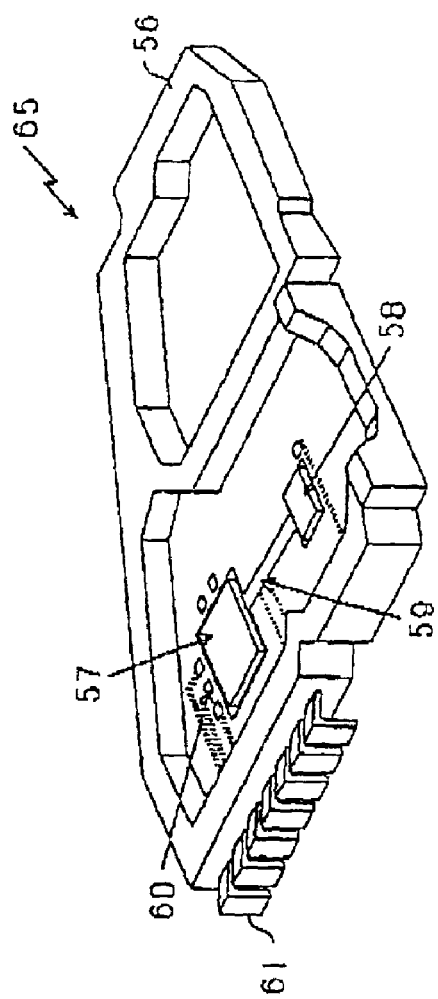
FIG. 14 is a perspective inner development view of an embodiment of the invention showing a light detector.

As shown in FIG. 14, the light receiving unit 65 accommodates a light receiving element 57 and a monitor PD 58 in the inner bottom plane of the top case 56 that is a part of the body. The top case 56 is molded from resin integrally with hoop material in which a plurality of electrode frames 60 and a plurality of fixing frames 59 for semiconductor chips are punched from the metallic pate that is excellent in electrically conductive property, similarly to the bottom case 40. The top case 56 is molded such that the fixing frame 59 and the electrode frame 60 are exposed on the inner bottom surface, and one end is pulled out to the external portion as terminal 61.

The light receiving unit 65 is configured such that the semiconductor chips of the monitor PD 58 and the light receiving element 57 are fixed onto the fixing frames 59 by die bonding and the like, and respective power sources and output electrodes are connected to the electrode frames 60 by wire bonding and the like. Thus, the supplies of the power source and the detections of the output signals from the monitor PD 58 and the light receiving element 57 are carried out through the terminal 61.

Figure 15:
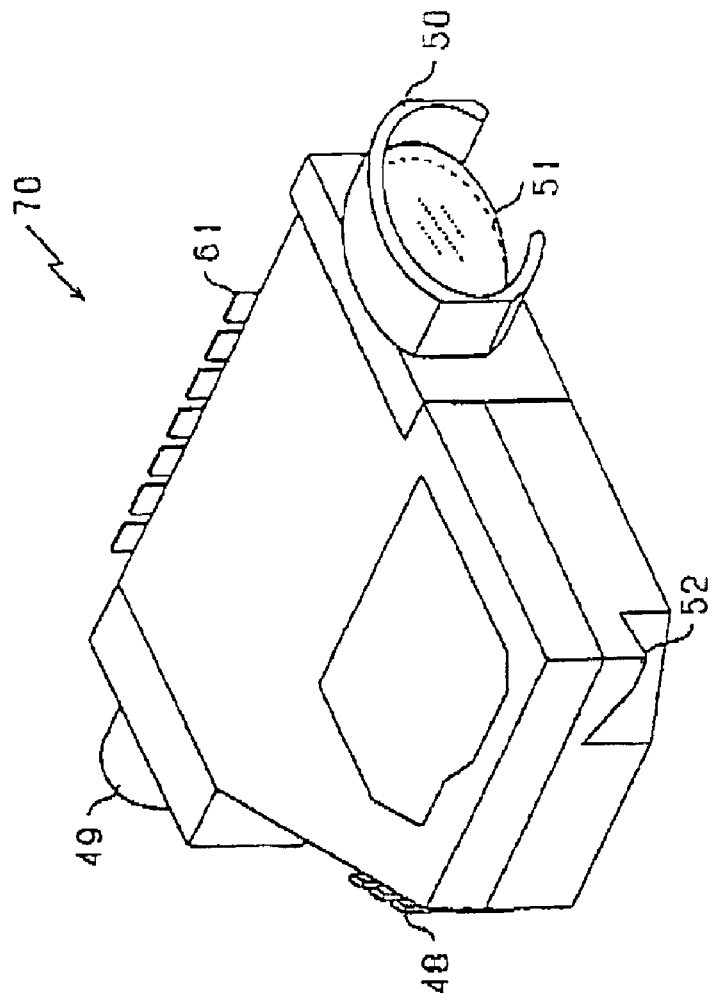
FIG. 15 is an external perspective view of an embodiment of the invention showing an optical parts accommodation module.

As shown in FIG. 15, the module 70 is configured such that the emitting unit 55 and the light receiving unit 65 are joined and adhered to each other through adhesive and the like while the optical parts are placed inside them. As mentioned above, the module 70 is designed such that the optical parts, such as the two light emitting elements 41 and 42 for emitting the light beams whose wave lengths are different from each other, the grating 43, the beam splitter 44, the light receiving element 57 and the like are packaged within the single resin body, and it is configured so as to be treated as one optical part whose performance is managed.

Figure 16:
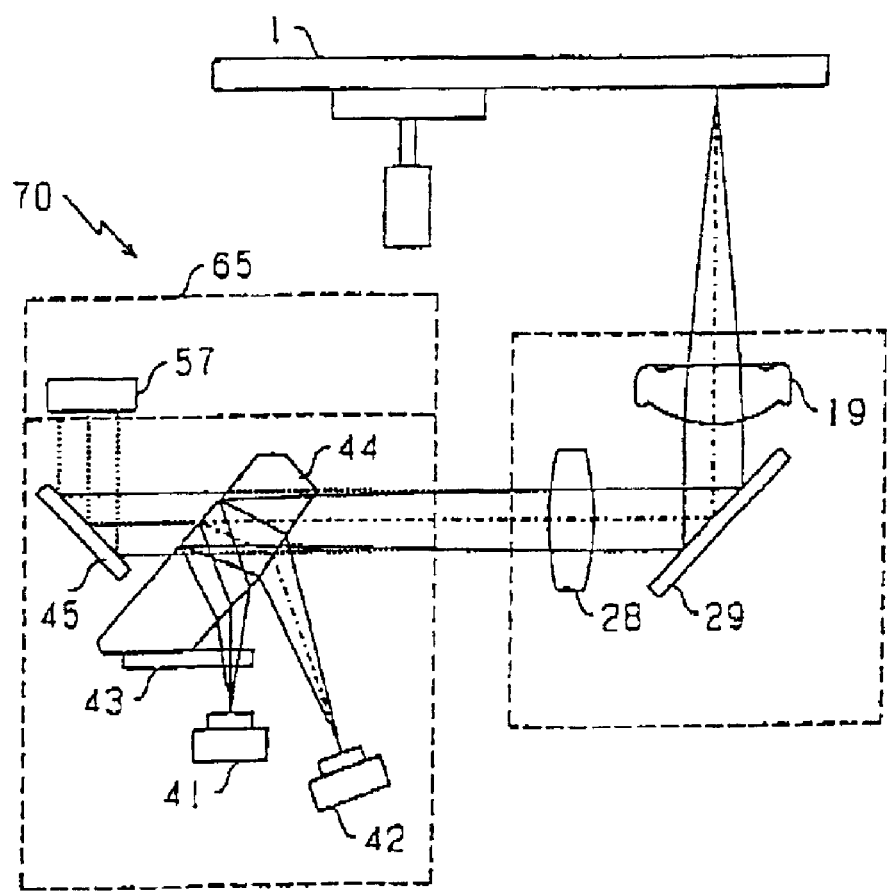
FIG. 16 is a schematic sectional view of an embodiment of the invention showing an entire light path in an optical pickup apparatus.
Figure 17:
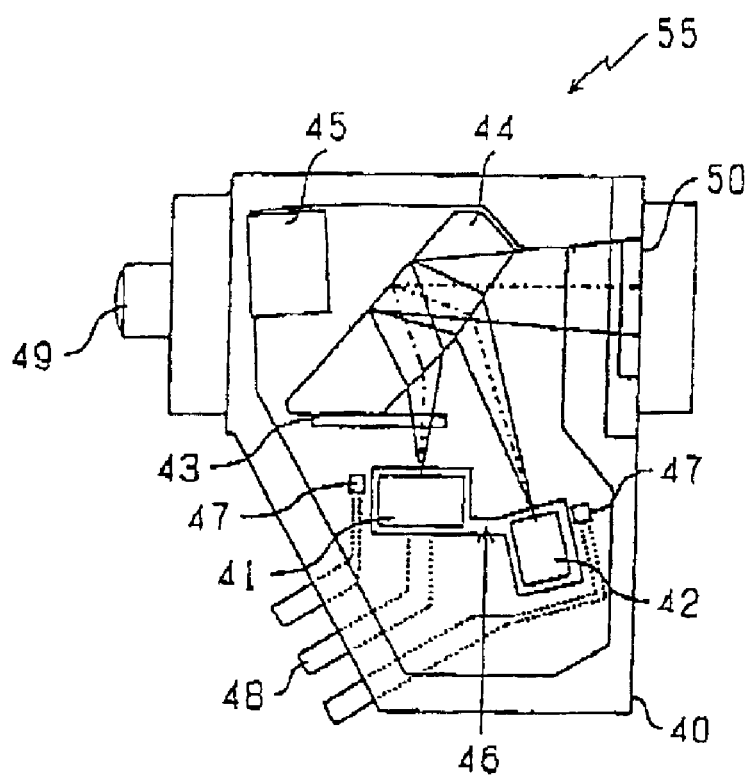
FIG. 17 is a schematic sectional view of an embodiment of the invention showing a light path in the light emitting unit.
Figure 18:
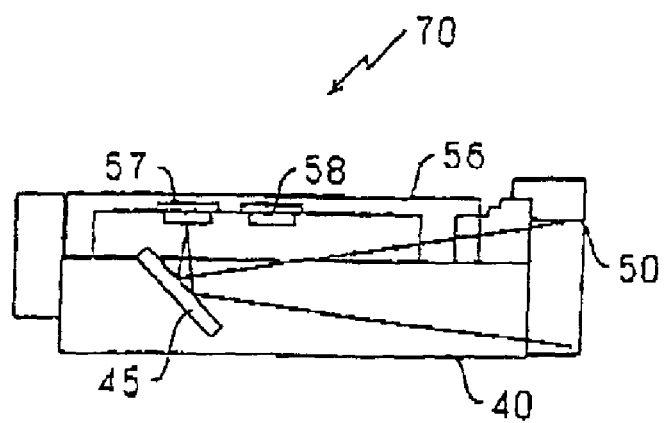
FIG. 18 is a schematic sectional view of an embodiment of the invention showing a light path from the light emitting unit to the light detector.

Next, an entire light path of the optical parts of the optical pickup apparatus 100 according to this embodiment and a light path of the module 70 will be described below with reference to FIGS. 16 through 18. FIG. 16 shows the entire light path of the optical parts of the optical pickup apparatus 100, FIG. 17 shows the light path in the emitting unit 55, and FIG. 18 shows the light path from the emitting unit 55 to the light receiving unit 65.

In the emitting unit 55, a first light beam emitted by the first light emitting element 42 exhibits the following light path. As shown in FIG. 17, it is passed through the grating 43. Then, once it is inputted from one main surface of the beam splitter 44, it is reflected on a rear of the beam splitter 44, and is directed from the main surface again to the central axis of the annular guide 50. Also, a second light beam outputted by the second light emitting element 42 exhibits the following light path. That is, once it is inputted from the other main surface of the beam splitter 44, it is reflected on the rear of the beam splitter 44, and it is directed from the main surface again to the central axis of the annular guide 50. The beam splitter 44 has the structure having the two main surfaces whose inclinations are different with respect to the first and second light emitting elements 41 and 42, in order that the light path in which the first light beam is reflected on the rear of the beam splitter 44 and is directed to the central axis of the annular guide 50 is equal to the light path in which the second light beam is reflected on the rear of the beam splitter 44 and is directed to the central axis of the annular guide 50. Such a configuration enables the optical axes of the first and second light beams and the axis line of the module 70 to agree with each other.

The first or second light beam emitted by the module 70 exhibits the light path shown in FIG. 16 in which it is passed through the collimator lens 28 for converting the light beams into parallel lights, and is then directed through the raising mirror 29 to the objective lens 19. This first or second light beam reflected by the raising mirror 29 is converged by the objective lens 19 to then generate a beam spot on an information recording surface of a disc 1.

Also, the first or second light beam reflected on the information recording surface of the disc 1 is inputted through the objective lens 19, the raising mirror 29 and the collimator lens 28 to the central axis of the annular guide 50 constituting the module 70. This first or second light beam inputted to the module 70 is transmitted through the beam splitter 44, is reflected by the reflection mirror 45, and is irradiated onto the light receiving element 57, as shown in FIG. 18. The beam splitter 44 has a role of splitting a returning beam, which is directed from the disc 1 to the light receiving unit 65, from an outgoing beam, which is directed from the emitting unit 55 to the disc 1.

In the light receiving element 57, when the first light emitting element 42 is driven, an operational process based on the three-beam method is carried out, and when the second light emitting element 42 is driven, an operational process based on the phase difference method is carried out. Then, the light receiving element 57 outputs a tracking error signal, a focus error signal and an RF signal. Also, the monitor PD 58 detects and outputs the output strengths of the light beams of the first and second light emitting elements 41 and 42. The optical pickup apparatus 100 controls the output strengths of the first and second light emitting elements 41 and 42, on the basis of a detection level outputted by the PD 58.

The optical pickup apparatus 100 in this embodiment carries out the grating adjustment as an initial adjustment of a relative position of the sub beam in the three-beam method. Such a grating adjustment and a grating adjustment mechanism will be described below with reference to FIGS. 19 through 25.

Figure 19:
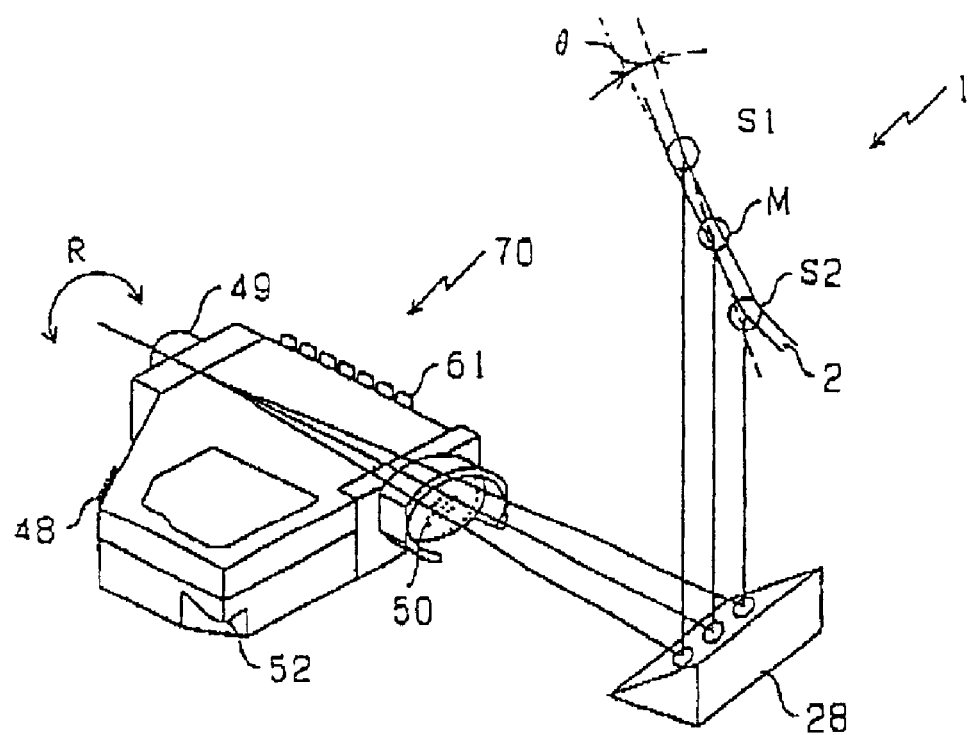
FIG. 19 is a schematic perspective view of an embodiment of the invention showing a relation between three beams and an information track.

As already explained with reference to FIG. 17, a pair of sub beams is generated as the first light beam emitted by the first light emitting element 42 is passed through the grating 43. Then, the reflection in the beam splitter 44 causes the three beams to be emitted from the central axis of the annular guide 50. Such three beams are sent through the collimator lens 28, the raising mirror 29 and the objective lens 19 to accordingly generate the three beam spots on an information track 2 on the disc 1. As shown in FIG. 19, the optical pickup apparatus 100 generates a main beam M on a center of the information track 2 of the disc 1, and emits two sub beams S1 and S2 onto the information recording surface in a condition that their alignment direction is inclined at a predetermined angle (which is an angle indicated by θ in FIG. 19) with respect to a tangent direction of an information track to be followed.

As mentioned above, the module 70 is rotatably held with the axis line for coupling the central axis of the annular guide 50 and the central axis of the protrusion 49 as the center. Also, the module 70 is designed such that the optical axis and the axis line agree with each other. Thus, in the optical pickup apparatus 100, it is possible to rotate the two sub beams S1 and S2 by a predetermined angle in a further plus or minus direction from the predetermined angle (θ) with respect to the tangent direction of the information track, which their alignment direction is to follow, by rotating the module 70 with the axis line as a center (which is indicated by an arrow R in FIG. 19). In short, in the optical pickup apparatus 100, it is possible to carry out the grating adjustment for rotating only the beam spot positions of the two sub beams S1 and S2 while fixing the main beam M to the center of the information track 2. Also, the optical pickup apparatus 100 in this embodiment is designed so as to generate the tracking error signal based on the phase difference method when recording onto and reproducing from the DVD. Thus, even if the grating adjustment optimal for the CD is carried out, it has no influence on the operation for recording onto and reproducing from the DVD.

Figure 20:
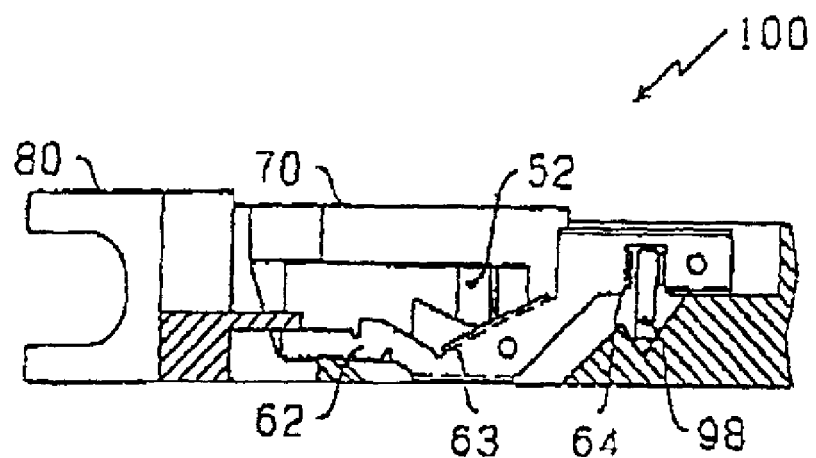
FIG. 20 is a sectional view of an embodiment of the invention for explaining a method of adjusting a grating of the module.
Figure 21:
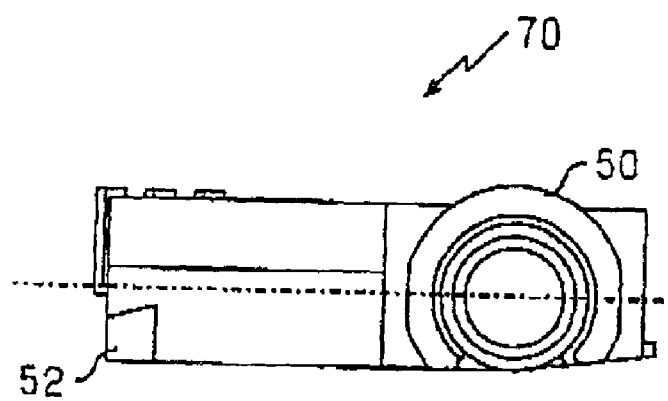
FIG. 21 is a front view of an embodiment of the invention for explaining a method of adjusting the grating of an optical parts accommodation module.
Figure 22:
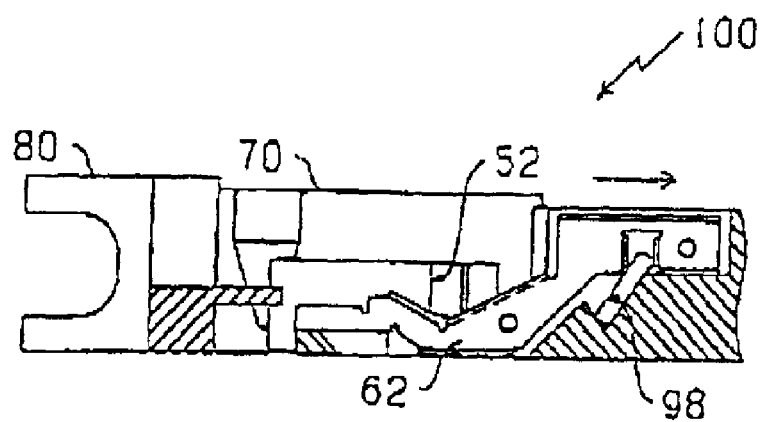
FIG. 22 is a sectional view of an embodiment of the invention for explaining a method of adjusting the grating of an optical parts accommodation module.
Figure 23:
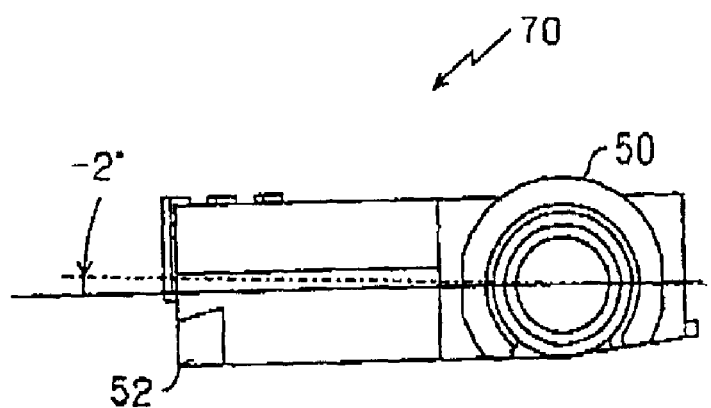
FIG. 23 is a front view of an embodiment of the invention for explaining a method of adjusting the grating.
Figure 24:
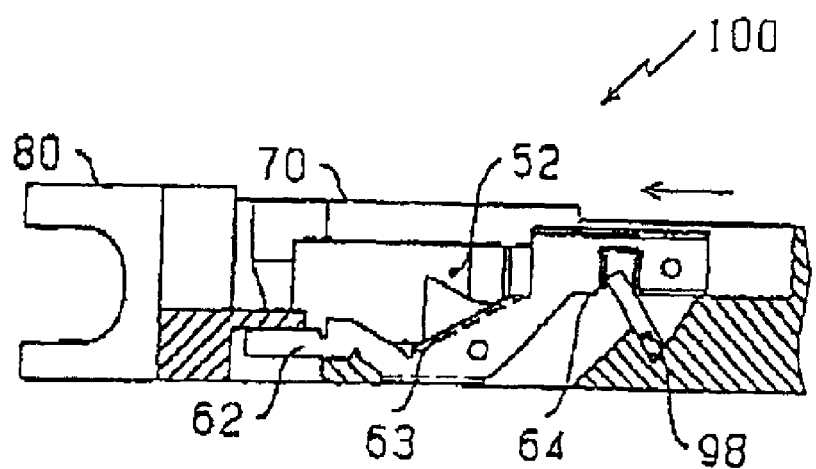
FIG. 24 is a sectional view of an embodiment of the invention for explaining a method of adjusting the grating.
Figure 25:
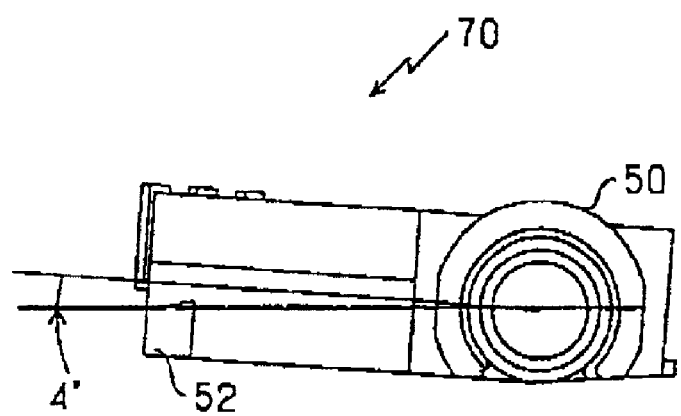
FIG. 25 is a front view of an embodiment of the invention for explaining a method of adjusting the grating.

Next, the grating adjustment mechanism of the module 70 will be described below with reference to FIGS. 20 through 25. FIG. 20, FIG. 22 and FIG. 24 are partial sectional views of the carriage body 80 near the slide cam member 62. FIG. 21, FIG. 23 and FIG. 25 are plan views showing the module 70 when it is viewed from the side of the annular guide 50. The sectional views shown in FIG. 20, FIG. 22 and FIG. 24 show the A—A portion of the carriage body 80 shown in FIG. 2.

As shown in FIG. 20, the slide cam member 62 is a metallic flat plate in which a part thereof is bent so as to provide structural strength. The slide cam member 62 has a cam plane 63 in contact with or abutting the contact plane 52 of the module 70, and a concave adjustment hole 64 (as an example of an engagement aperture portion), into which a minus driver 98 serving as one example of a grating adjustment member or the like is inserted. After the slide cam member 62 is inserted into the slide groove 83 of the carriage body 80, the contact cam 52 of the module 70 is placed on the cam plane 63 of the slide cam member 62. Accordingly, the slide cam member 62 is never turned over or dropped since it is sandwiched between the slide groove 83 of the carriage body 80 and the contact plane 52. The slide cam member 62 can be straightly moved in parallel to the plane including the axis line. Also, the cam plane 63 is inclined with respect to the straight direction.

The module 70 is designed such that a position at which the minus driver 98 can be vertically inserted into the adjustment hole 64 is defined as an initial position of an inclination of zero. In the optical pickup apparatus 100, the slide cam member 62 is set at the initial position to then mount the module 70. Thus, the module 70 is initially fixed to the carriage body 80 in the condition that the inclination is zero, as shown in FIG. 21.

FIG. 22 shows an example in which the minus driver 98 inserted into the adjustment hole 64 is rotated to the right. The slide cam member 62 is moved to a direction indicated by an arrow of FIG. 22. The contact plane 52 of the module 70 is downwardly moved along the cam plane 63 of the slide cam member 62. The module 70 is fixed, for example, in a condition that it is inclined at about −2 degrees with respect to the initial position, as shown in FIG. 23. Thus, in the optical pickup apparatus 100, it is possible to generate the beam spots of the two sub beams S1 and S2 at positions where they are rotated by about −2 degrees from the predetermined angle (θ) with respect to the tangent direction of the information track, which their alignment direction is to follow.

Also, FIG. 24 shows an example in which the minus driver 98 inserted into the adjustment hole 64 is rotated to the left. The slide cam member 62 is moved to a direction indicated by an arrow of FIG. 24. The contact plane 52 of the module 70 is upwardly moved along the cam plane 63 of the slide cam member 62. The module 70 is fixed, for example, in a condition that it is inclined at about +4 degrees with respect to the initial position, as shown in FIG. 25. Thus, in the optical pickup apparatus 100, it is possible to generate the beam spots of the two sub beams S1 and S2 at positions where they are rotated by about +4 degrees from the predetermined angle (θ) with respect to the tangent direction of the information track, which their alignment direction is to follow.

As mentioned above, the optical pickup apparatus 100 in this embodiment is designed such that the module 70 is fixed to the carriage body 80 by using the module plate 84, and the contact plane 52 of the module 70 is in contact with and supported on the cam plane 63 of the slide cam member 62. The slide cam member 62 is held such that it is inserted into the slide groove 83, the contact plane 52 of the module 70 is supported on the cam plane 63, and its contact resistance is large. Thus, in the optical pickup apparatus 100 in this embodiment, it is not necessary to fix the grating adjustment mechanism after the execution of the grating adjustment. Also, the slide cam member 62 can be straightly moved in parallel to the plane including the axis line of the module 70, which is a rotational central line of the grating adjustment. Hence, it is possible to concentrate the allowable space in the movement of the slide cam member 62 necessary for the grating adjustment within a thickness width of the module 70. Hence, this can contribute to the entire miniaturization.

In addition, as for the optical pickup apparatus 100 of the present embodiment, the explanation has been made for such a case that the rotational amount of the grating adjustment is between about −2 degrees and about +4 degrees. However, the rotational amount of the present invention is not limited to this range.

As described above, in the present invention, by constructing the magnet such that the magnetic flux is not applied to the adjacent portion of the tracking coil at the initial position, the magnetic flux applied to the adjacent portion of the tracking coil can be reduced even when the tracking coil is moved in the focus direction, so that the rotational driving force generated at the tracking coil can be reduced. Accordingly, in the above described embodiment, such a case has been explained that the magnetic flux is not applied to the adjacent portion of the tracking coil at the initial position. However, as a modified embodiment of the present invention, the magnet may be constituted such that the magnetic flux is applied to the adjacent portion of the tracking coil by a density or intensity less than that of the magnetic flux applied to the other portion of the tracking coil. As one example, with respect to a rectangular shaped magnet such as the magnet 28 in the embodiment, the magnetic polarization may be performed in the shape as in the magnet 25 in the embodiment. In such an example, the magnet generates the magnetic flux, whose density or intensity is less than that in the magnetically polarized portion, at the adjacent portion of the tracking coil, which is not magnetically polarized, due to the influence of the magnetically polarized portion. By this, such a magnet that the magnetic flux at the adjacent portion of the tracking coil at the initial portion is less than the magnetic flux at the other portion is realized. According to this modified embodiment, it is still possible to reduce the rotational driving force generated at the tracking coil, by the principle similar to that of the above described embodiment.

As described above in detail, according to the present invention, it is possible to realize the grating adjustment whose space factor is excellent while employing a relatively simple structure.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2000-341061 filed on Nov. 8, 2000 including the specification, claims, drawings and summary is incorporated herein by reference in its entirety.

What is claimed is:

1. An optical pickup apparatus comprising:

a carriage body;

an optical parts accommodation module mounted on said carriage body and accommodating at least (i) a light beam emitting portion for emitting a light beam, (ii) a light beam receiving portion, (iii) a beam splitter and (iv) a grating for generating a sub beam for a tracking adjustment out of the light beam emitted from said light beam emitting portion; and a grating adjustment mechanism for rotating said optical parts accommodation module, said optical parts accommodation module being mounted on said carriage body in such a condition that said optical parts accommodation module is allowed to rotate with an axis line of the light beam, which is irradiated toward a disc, as a rotational center, said grating adjustment mechanism having a cam plane abutting an adjacent plane formed at a portion apart from the axis line and including a slide cam member mounted in such a condition that said slide cam member is regulated to be movable on a straight line with respect to said carriage body.

2. An optical pickup apparatus according to claim 1, wherein said slide cam member is movable on the straight line in parallel to a plane including the axis line.

3. An optical pickup apparatus according to claim 2, wherein said cam plane is inclined with respect to the straight line.

4. An optical pickup apparatus according to claim 1, wherein said slide cam member comprises an engagement aperture portion with which a driver for a grating adjustment is engaged.

5. An optical pickup apparatus according to claim 1, wherein said optical parts accommodation module comprises:

an annular guide portion disposed around an opening through which the light beam is irradiated to an external portion thereof with the axis line of the light beam as a center; and a circular arc protrusion with the axis line as a center on a line extended from the axis line.

6. An optical pickup apparatus according to claim 5, wherein said carriage body comprises:

a V shaped supporting portion for supporting said annular guide portion; and a V shaped supporting portion for supporting said circular arc protrusion.

7. An optical parts accommodation module mounted on an optical pickup apparatus comprising:

a casing body;

at least (i) a light beam emitting portion, (ii) a light beam receiving portion, (iii) a beam splitter for splitting an outgoing light beam, which is directed toward a disc from said light beam emitting portion, from a returning light beam, which is directed toward said light beam receiving portion from said disc and (iv) a grating for generating a sub beam for a tracking adjustment out of a light beam emitted from said light beam emitting portion, which are accommodated in said casing body; and an opening portion formed in said casing body, through which the light beam is irradiated to an external portion toward said disc, said casing body comprising an annular guide portion disposed around the opening with an axis line of the light beam irradiated through the opening as a center, a circular arc protrusion with the axis line as a center on a line extended from the axis line, and an abutting plane which is formed at a portion apart from the axis line and to which a grating adjustment member abuts with the axis line as a center thereof.

8. An optical apparatus comprising:

a module comprising a light source that emits a light beam and a grating that generates a sub beam from the light beam; and a module rotator that rotates the module, wherein the module rotates about an axis of the light beam, which is irradiated toward a recording medium, and wherein the module rotator has a cam plane that abuts a plane formed apart from the axis and has a slide cam member that moves.

9. An optical apparatus according to claim 8, wherein said slide cam member moves on a straight line that is parallel to a plane that includes the axis.

10. An optical apparatus according to claim 9, wherein said cam plane is inclined with respect to the straight line.

11. An optical apparatus according to claim 8, wherein said slide cam member comprises an engagement aperture portion with which a driver for the module rotator is engaged.

12. An optical pickup apparatus according to claim 8, wherein the module rotator comprises:

an annular guide disposed around an opening through which the light beam is irradiated, wherein the axis of the light beam is substantially at a center of the opening; and a circular arc protrusion, wherein the axis of the light beam is substantially at a center of the circular arc protrusion.

13. An optical pickup apparatus according to claim 12, further comprising:

a carriage body that comprises a first concave-shaped support that supports said annular guide and that comprises a second concave-shaped support that supports said circular arc protrusion.

* * * * *